US008232792B2

(12) United States Patent
Hampo et al.

(10) Patent No.: US 8,232,792 B2
(45) Date of Patent: Jul. 31, 2012

(54) SYSTEM AND METHOD FOR CONTROLLING THE OUTPUT VOLTAGE OF A POWER SUPPLY

(75) Inventors: Richard Hampo, Plymouth, MI (US); Benjamin D. Sweet, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 239 days.

(21) Appl. No.: 12/855,754

(22) Filed: Aug. 13, 2010

(65) Prior Publication Data

US 2012/0038329 A1  Feb. 16, 2012

(51) Int. Cl.
*H02M 3/156* (2006.01)
*G05F 1/575* (2006.01)
(52) U.S. Cl. ........................ 323/351; 323/285
(58) Field of Classification Search ............. 323/282, 323/284, 285, 286, 351
See application file for complete search history.

(56) References Cited

U.S. PATENT DOCUMENTS

| | | | | |
|---|---|---|---|---|
| 5,485,077 A * | 1/1996 | Werrbach | ...................... | 323/286 |
| 5,917,312 A * | 6/1999 | Brkovic | ........................ | 323/282 |
| 6,459,247 B1 | 10/2002 | Benes | | |
| 7,279,805 B2 | 10/2007 | Senda et al. | | |
| 7,506,182 B2 | 3/2009 | Taniguchi et al. | | |
| 7,804,287 B2 * | 9/2010 | Terdan et al. | ................. | 323/351 |
| 7,956,594 B2 * | 6/2011 | Sofer et al. | ..................... | 323/285 |
| 7,990,126 B1 * | 8/2011 | Zhang et al. | .................. | 323/284 |
| 8,008,902 B2 * | 8/2011 | Melanson et al. | ............ | 323/285 |
| 8,089,258 B2 * | 1/2012 | Tsai | .............................. | 323/285 |

* cited by examiner

*Primary Examiner* — Gary L Laxton
(74) *Attorney, Agent, or Firm* — Brooks Kushman P.C.

(57) ABSTRACT

A system and method for controlling the output voltage of a power supply that includes a control section and an interconnect section having an output point. A voltage regulator provides a control section voltage, and a current measurement device measures a control section current and generates a current signal. A controller receives the current signal and a voltage command signal representing a desired output voltage at the output point of the interconnect section. The controller generates an adjusted voltage command signal based on the voltage command signal representing the desired output voltage, the current signal, a control section internal resistance and an interconnect section external resistance. The voltage regulator receives the adjusted voltage command signal and provides a control section voltage based thereon in order to supply an output voltage at the output point that is substantially equal to the desired output voltage.

20 Claims, 4 Drawing Sheets

SYSTEM AND METHOD FOR CONTROLLING THE OUTPUT VOLTAGE OF A POWER SUPPLY

TECHNICAL FIELD

The following relates to a system and method for controlling the output voltage of a power supply.

BACKGROUND

Automotive vehicles commonly include power supply systems for providing voltage regulation and powering vehicle electrical systems. Increasingly, power supply systems are employed for use in charging electric and hybrid vehicles and powering the electrical systems of such vehicles. Power supply systems designed for use in charging electric and hybrid vehicles and powering vehicle systems require precise control of the output voltage at the power supply terminals.

Power supply systems, including those for use in automotive vehicles, are well known in the art. An exemplary power supply system is shown in U.S. Pat. No. 6,459,247 entitled "Power Supply Capable Of Being Configured To Generate Positive And Negative Output Resistances." Examples of automotive power supply systems, as well as various features thereof, are shown in U.S. Pat. No. 7,279,805 entitled "Vehicle Power Supply System With A Series Regulator" and in U.S. Pat. No. 7,506,182 entitled "Vehicle Mounted Power Supply System."

To control the voltage output at the endpoint of a power supply interconnect cable in order to meet necessary accuracy, prior art power supplies have required sense leads at the interconnect output point. Such sense leads, however, are expensive and difficult to package. They can also cause a power supply to have lower reliability. In that regard, if the sense leads break or are cut, the power supply will not regulate. The use of sense leads also makes the power supply more sensitive to noise.

An alternative to the use of sense leads is to increase the size of the interconnect cable by using thicker, lower resistance wire. With sufficiently thick, low resistance wire, the voltage drop can be made lower at the output point of the interconnect cable than the voltage precision requirement for a particular application. Significantly, however, such a design adds both cost and weight to the interconnect cable and the power supply system.

There exists a need, therefore, for a system and method for controlling an output voltage of a power supply that would address various problems of prior art systems and methods. Such a system and method would eliminate the use of sense leads at the output point of the power supply interconnect cable, but without the use of thicker, lower resistance wire in the interconnect cable to do so. Such a system and method would instead compensate for voltage drop on a power supply interconnect cable, thereby decreasing costs while maintaining or improving reliability in the operation of a vehicle power supply system.

SUMMARY

According to one embodiment disclosed herein, a system is provided for controlling an output voltage of a power supply. The power supply comprises a control section and an interconnect section having an output point. The system for controlling the output voltage of the power supply comprises a voltage regulator for providing a control section voltage, and a current measurement device for measuring a control section current and generating a current signal representative thereof.

The system also comprises a controller for (i) receiving the control section current measurement signal and a voltage command signal representing a desired output voltage at the output point of the interconnect section, and (ii) generating an adjusted voltage command signal based on the voltage command signal representing the desired output voltage, the current measurement signal, a control section internal resistance and an interconnect section external resistance. The voltage regulator receives the adjusted voltage command signal and provides a control section voltage based thereon in order to supply an output voltage at the output point that is substantially equal to the desired output voltage.

According to another embodiment disclosed herein, a method is provided for controlling an output voltage of a power supply. The power supply comprises a control section and an interconnect section having an output point. The method for controlling the output voltage of the power supply comprises receiving a voltage command representing a desired output voltage at the output point of the interconnect section.

The method further comprises generating an adjusted voltage command based on the voltage command representing the desired output voltage, a control section current, a control section internal resistance and an interconnect section external resistance. The method still further comprises providing a control section voltage based on the adjusted voltage command in order to supply an output voltage at the output point that is substantially equal to the desired output voltage.

According to a further embodiment disclosed herein, a non-transitory computer readable medium having computer executable instructions stored thereon for controlling an output voltage of a power supply is provided. The power supply comprises a control section and an interconnect section having an output point. The computer executable instructions comprise instructions for receiving a current signal representative of a control section current, and instructions for receiving a voltage command signal representing a desired output voltage at the output point of the interconnect section.

The computer readable instructions further comprise instructions for generating an adjusted voltage command signal based on the voltage command signal representing the desired output voltage, the current signal, a control section internal resistance and an interconnect section external resistance. The computer readable instructions still further comprise instructions for providing a control section voltage control signal based on the adjusted voltage command signal, the control signal for use in supplying an output voltage at the output point that is substantially equal to the desired output voltage.

A detailed description of these embodiments of a system and method for controlling the output voltage of a power supply and accompanying drawing are set forth below.

DETAILED DESCRIPTION

Figure 1:
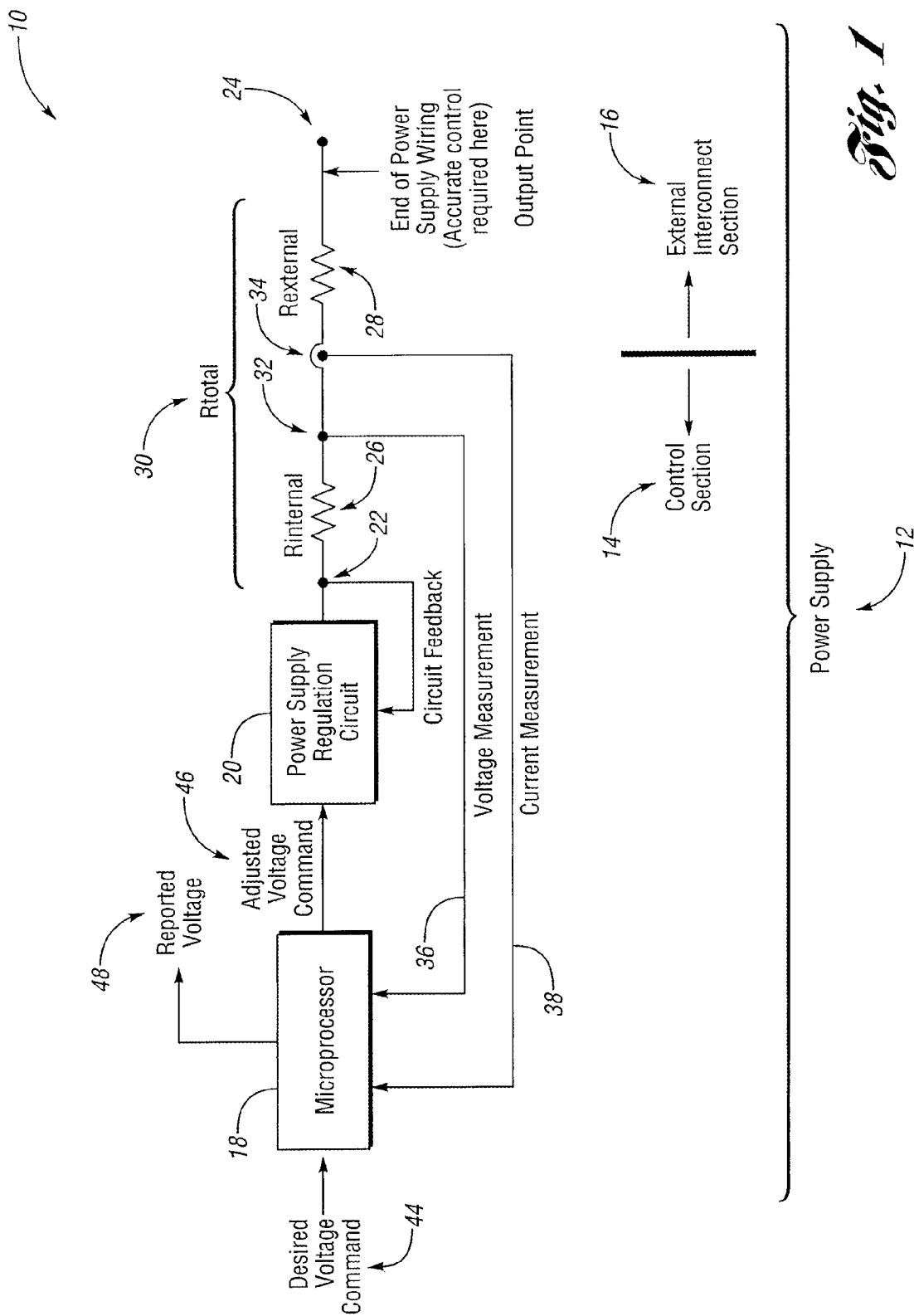
FIG. 1 is a simplified system diagram of an embodiment of a system for controlling the output voltage of a power supply disclosed herein.

With reference to FIGS. 1-4, a more detailed description of various embodiments of a system and method for controlling the output voltage of a power supply will be described. For ease of illustration and to facilitate understanding, like reference numerals have been used herein for like components and features throughout the drawings.

As noted above, power supply systems, including for use in automotive vehicles, are well known in the art. Examples of power supply systems and various features thereof are shown in U.S. Pat. No. 6,459,247 entitled "Power Supply Capable Of Being Configured To Generate Positive And Negative Output Resistances," U.S. Pat. No. 7,279,805 entitled "Vehicle Power Supply System With A Series Regulator," and U.S. Pat. No. 7,506,182 entitled "Vehicle Mounted Power Supply System."

Power supply systems are commonly used in automotive vehicles to provide voltage regulation and power vehicle electrical systems. Power supply systems are also increasingly being employed for use in charging electric and hybrid vehicles and powering the electrical systems of such vehicles. As noted above, power supply systems designed for use in charging electric and hybrid vehicles and powering electrical systems in such vehicles require precise control of the output voltage at the power supply terminals.

Referring now to FIG. 1, a simplified system diagram of an embodiment of a system (10) for controlling the output voltage of a power supply (12) is shown. In that regard, the power supply (12) may provide both high voltage and low voltage outputs. High voltage output from the power supply (12) may be on the order of 200-400 volts and may be used for charging or re-charging electric or hybrid vehicle batteries. Low voltage output from the power supply (12) may be on the order of 12 volts and may be used for powering vehicle electrical systems and/or accessories.

As seen in FIG. 1, the system (10) includes a power supply (12) having a control section (14) and an external interconnect section (16). The control section (14) may include a microprocessor controller (18) and a voltage regulator or power supply regulation circuit (20) having circuit feedback (22). In that regard, voltage regulator (20), including circuit feedback (22), operates in a fashion well known in the art.

The external interconnect section (16) of the power supply (12) has an output point (24) at the end of the wiring of the external interconnect section (16) of the power supply (12). It is at the output point (24) where accurate control of the voltage supplied is required. The control section (14) has a resistance (26) associated therewith, which may be referred to as an internal resistance or as a control section internal resistance. The external interconnect section (16) likewise has a resistance (28) associated therewith, which may be referred to as an external resistance or as an interconnect section external resistance. The control section internal resistance (26) and the interconnect section external resistance (28) together comprise a total resistance (30), which may be referred to as a total power supply resistance.

Still referring to FIG. 1, the control section (14) of the power supply (12) may also include a voltage measurement device (32) and a current measurement device (34). The voltage measurement device (32) is configured to provide a voltage measurement signal (36), which may also be referred to as a measured voltage signal or a voltage signal, to the microprocessor (18). Similarly, the current measurement device (34) is configured to provide a current measurement signal (38), which may also be referred to as a measured current signal or a current signal, to the microprocessor (18).

Figure 2:
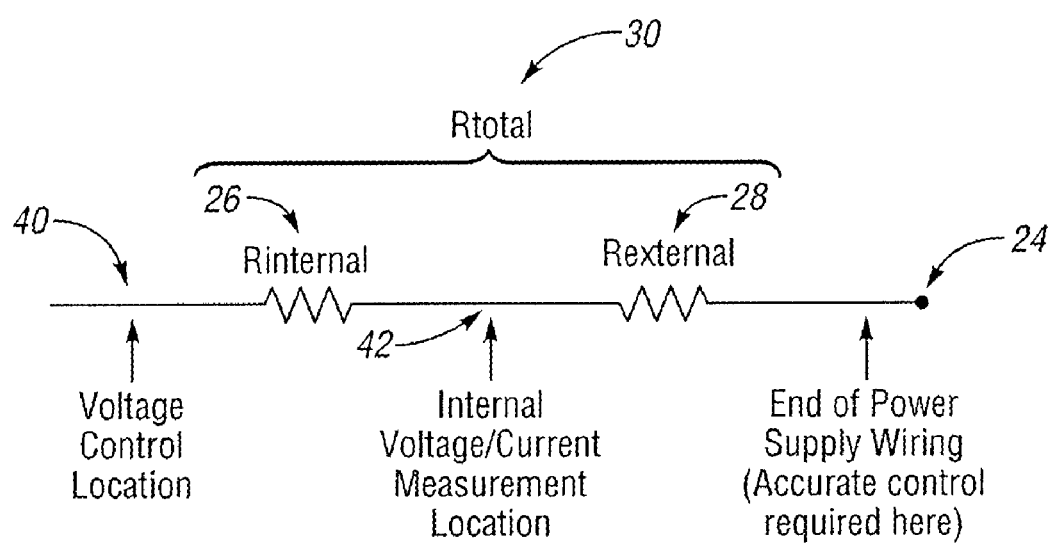
FIG. 2 is a simplified schematic of internal resistance and external resistance in an embodiment of a system for controlling the output voltage of a power supply disclosed herein.

In that regard, referring now to FIG. 2, a simplified schematic of internal resistance and external resistance in an embodiment of a system for controlling an output voltage of a power supply is shown. As seen therein, and with continuing reference to and as described in connection with FIG. 1, the power supply (12) has an internal resistance (26) and an external resistance (28), which together comprise a total power supply resistance (30). Voltage control by the voltage regulator (20) occurs at a location (40) before a voltage drop associated with the total power supply resistance (30).

Voltage and current measurements by voltage measurement device (32) and current measurement device (34) occur at a location (42) after a voltage drop associated with the internal resistance (26), but before a voltage drop associated with the external resistance (28). As previously noted, the power supply (12) has an output point (24) at the end of the wiring of the external interconnect section (16), and it is at the output point (24) where accurate control of the voltage supplied is required.

Operation of the system and a method for controlling the output voltage of the power supply will be described in greater detail below. Generally, however, with reference to FIGS. 1 and 2, the system and method use a compensation algorithm to predict the voltage drop resulting from the total resistance (30) of the power supply (12), and adjust the output voltage provided by the voltage regulator (20) accordingly in order to supply a desired voltage at the output point (24) of the external interconnect section (16). It should be noted that such compensation and control can be done via hardware or software depending on the architecture desired or required.

The system and method for controlling the output voltage of a power supply can also compensate for the voltage drop between the controlled point (40) and the measurement point (42). As well, the temperature coefficients of resistance for electrical conductors that may typically be used in a power supply are well known. For example, copper has a well known temperature coefficient of resistance of approximately 0.4%/° C. The system and method for controlling the output voltage of a power supply described herein can adjust the compensation and control based on temperature, thereby providing for increased accuracy in the output voltage supplied.

Referring again to FIG. 1, the microprocessor (18) receives a voltage command signal (44) representing a desired output voltage to be produced at the output point (24) of the external interconnect section (16) of the power supply (12). The microprocessor (18) may be appropriately programmed to use the current measurement signal (38), the internal resistance (26) and the external resistance (28) to predict a voltage drop resulting from the total resistance (30) of the power supply (12). In that regard, as part of such a prediction, the microprocessor (18) may also be appropriately programmed to adjust the internal resistance (26) and the external resistance (28) based on a measurement of temperature provided by a temperature measurement device (not shown).

The microprocessor (18) uses the predicted voltage drop to compensate and/or adjust the voltage command signal (40) to generate an adjusted voltage command signal (46) which is transmitted to the voltage regulator (20). The adjusted voltage command signal (46) from the microprocessor (18) causes the voltage regulator (20) to provide an output voltage having a sufficient level so that, after a voltage drop due to the internal resistance (26) and the external resistance (28), the voltage level supplied at the output point (24) of the external interconnect section (16) is substantially equal to the desired output voltage represented by the voltage command signal (44). Based on the adjusted voltage command signal (46) and the predicted voltage drop, the microprocessor (18) may also generate a reported output voltage signal (48) representative of an expected output voltage at the output point (24). Such a reported output voltage signal (48) may be used to provide a display for a user of the expected output voltage of the power supply (12).

The voltage measurement signal (36) may be used by the microprocessor (18) for diagnostic purposes. However, since the voltage signal (36) is different from and does not represent the desired voltage command signal (44), the adjusted voltage command signal (46), or the actual voltage at the output point (24), the use of the voltage signal (36) by the microprocessor (18) in the control algorithm could lead to the introduction of errors. As a result, and to prevent the accumulation of errors if the voltage signal (36) is not sufficiently accurate, the voltage measurement made by the voltage measurement device (32) at the measurement point (42) (see FIG. 2) is not used in the control loop by microprocessor (18). The control strategy is therefore feed forward with respect to voltage, with an adjustment by the microprocessor (18) based on the current measurement made by the current measurement device (34) and reported in the form of the current measurement signal (38).

It should be noted that, in order to decrease system sensitivity to noise, the adjustment by the microprocessor (18) based on current can be slow. In that regard, the bandwidth or sampling by the microprocessor (18) of the current measurement made by the current measurement device (34) affects the fine adjustment accuracy, rather than stability of the overall system output voltage provided at output point (24). Such sampling of the current by the microprocessor (18) may periodic, and the periodic time intervals may be adjusted or varied as desired.

It should also be noted that the voltage represented by the voltage signal (36) will be greater than the voltage represented by the reported output voltage signal (48). This is so because the voltage signal (36) represents the voltage measurement made by the voltage measurement device (32) at the measurement point (42), while the reported output signal (48) represents the expected output voltage at the output point (24) where the microprocessor (18) has accounted for the voltage drop due to the external resistance (28).

Figure 3:
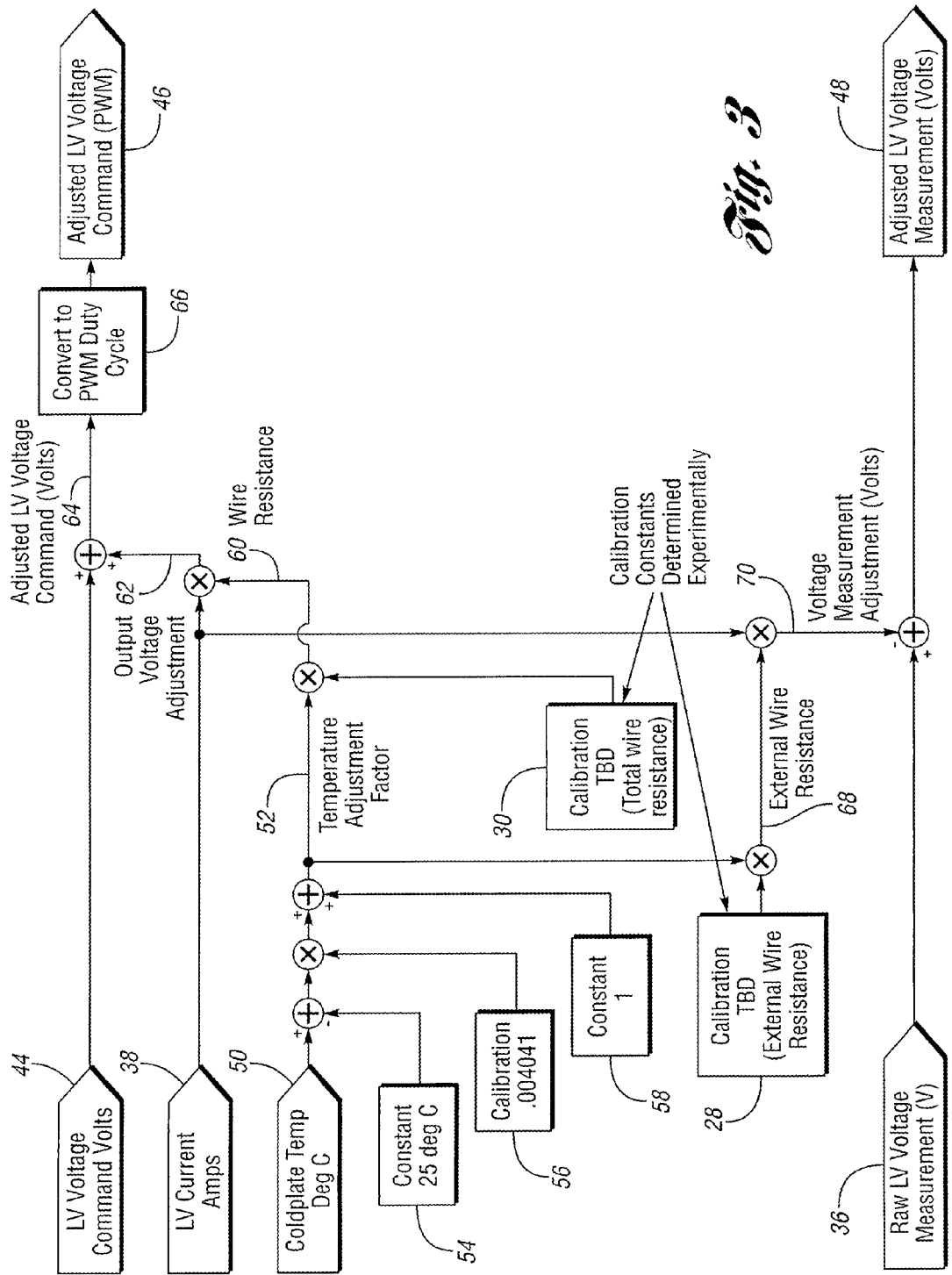
FIG. 3 is a simplified compensator block diagram for use in an embodiment of a system for controlling the output voltage of a power supply disclosed herein.

Referring now to FIG. 3, a simplified compensator block diagram is shown for use in an embodiment of a system for controlling the output voltage of a power supply, such as that described above in connection with FIGS. 1 and 2. As seen in FIG. 3, a desired voltage command signal (44), which may be a low voltage (LV) command signal, is compensated to provide an adjusted voltage command signal (46). Such compensation is based on the measured current signal (38), a measured temperature signal (50) generated by a temperature measurement device (not shown) in the power supply, which may include a temperature adjustment factor (52), as well as the external resistance (28) and the total resistance (30) of the power supply conductors or wires.

In that regard, the measured temperature signal (50) is converted into the temperature adjustment factor (52) by first subtracting a 25° C. constant (54) to the value represented by the temperature signal (50). That sum is then multiplied by a calibration factor (56) representing the temperature coefficient of resistance of the electrical conductor used in the power supply. (In FIG. 3, the calibration factor (56) is shown as 0.004041, which represents the temperature coefficient of resistance of copper. Other calibration factors may be used representing the temperature coefficient of resistance of other conductors, depending on the conductors employed.) A constant (58), 1, is then added to produce the temperature adjustment factor (52). It should be noted here that the temperature adjustment factor (52) may also be generated using floating point rather than the fixed point math depicted here.

Still referring to FIG. 3, the temperature adjustment factor (52) is multiplied by a calibration factor representing the total resistance (30) of the power supply conductors. In that regard, such a calibration factor may be determined empirically based on the material, mass and/or length of the electrical conductors used in the internal and external wires of the power supply. As previously noted, the total resistance (30) represents the combined internal resistance (26) and external resistance (28) of the power supply conductors. The result (60) of such an operation represents an adjustment of the total resistance (30) of the power supply based on temperature.

Such an adjusted total resistance (60) is then multiplied by the current represented by the current signal (38) to provide an output voltage adjustment (62). The output voltage adjustment (62) is then added to the voltage represented by the desired voltage command signal (44) to provide an adjusted voltage (64). Thus, the voltage represented by the desired voltage command signal (44), which as described above in connection with FIGS. 1 and 2 is supplied to the voltage regulator (20), is adjusted up to compensate for the voltage drop that occurs as a result of the internal resistance (26) and the external resistance (28). The adjusted voltage (64), in volts, is converted (66) to a pulse width modulated (PWM) duty cycle to provide the adjusted voltage command signal (46).

Referring still to FIG. 3, the temperature adjustment factor (52) is also multiplied by a calibration factor representing the external wire resistance (28) of the conductors of the external interconnect section (16). Here again, such a calibration factor may be determined empirically based on the material, mass and/or length of the electrical conductors used in the wire(s) of the external interconnect section (16). The result (68) of such an operation represents an adjustment of the external resistance (28) based on temperature.

Such an adjusted external resistance (68) is then multiplied by the current represented by the current signal (38) to provide a voltage adjustment (70). The voltage adjustment (70) is then subtracted from the voltage represented by the measured voltage signal (36) to provide the expected voltage (48) reported by the microprocessor (18). As is readily apparent from FIG. 3, and as described above in connection with FIGS. 1 and 2, the voltage measurement signal (36) is not used in the control of the output voltage supplied at the output point of the power supply.

Figure 4:
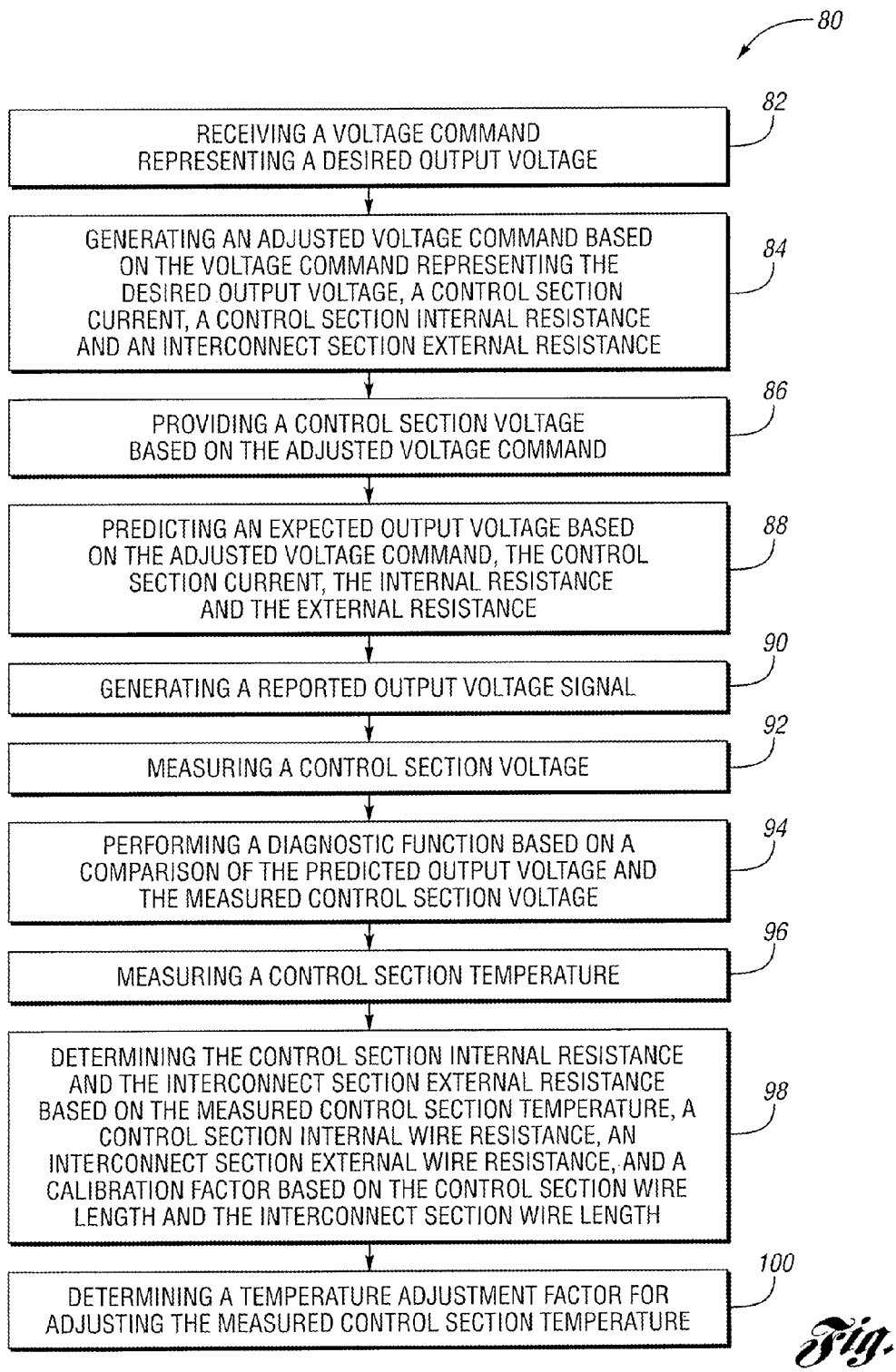
FIG. 4 is a simplified flowchart of an embodiment of a method for controlling the output voltage of a power supply disclosed herein.

Referring next to FIG. 4, a simplified flowchart is shown of an embodiment of a method (80) for controlling the output voltage of a power supply that includes a control section and an interconnect section having an output point. As seen therein, the method (80) may comprise receiving (82) a voltage command representing a desired output voltage at the output point of the power supply, and generating (84) an adjusted voltage command based on the voltage command representing the desired output voltage, a control section current, a control section internal resistance and an interconnect section external resistance.

The method (80) may further comprise providing (86) a control section voltage based on the adjusted voltage command in order to supply an output voltage at the power supply output point that is substantially equal to the desired output voltage. In that regard, the control section current may be a sampled measured value, and may be sampled at periodic time intervals which may be adjusted or variable.

Still referring to FIG. 4, the method (80) of controlling an output voltage of a power supply may further comprise predicting (88) an expected output voltage of the power supply at the output point based on the adjusted voltage command, the control section current, the internal resistance and the external resistance, and generating (90) a reported output voltage signal representative of the expected output voltage of the power supply at the output point. The method (80) may further comprise measuring (92) a control section voltage, and performing (94) a diagnostic function based on a comparison of the predicted output voltage and the measured control section voltage.

The method (80) may still further comprise measuring (96) a control section temperature, and determining (98) the control section internal resistance and the interconnect section external resistance based on the measured control section temperature, a control section internal wire resistance, an interconnect section external wire resistance, and a calibration factor based on the control section wire length and the interconnect section wire length. The method (80) of controlling the output voltage of a power supply may further comprise determining (100) a temperature adjustment factor for adjusting the measured control section temperature.

It should be noted here that the steps of the method (80) described herein may be performed in any order, including simultaneously. As well, the steps of the method (80) for controlling the output voltage of a power supply that includes a control section and an interconnect section having an output point may be performed via hardware, software, or any combination thereof.

Those steps may also be embodied as computer executable instructions stored on a non-transitory computer readable medium. Such computer executable instructions may comprise instructions for receiving a current signal representative of a control section current, receiving a voltage command signal representing a desired output voltage at the output point of the power supply, generating an adjusted voltage command signal based on the voltage command signal representing the desired output voltage, the current signal, a control section internal resistance and an interconnect section external resistance, and providing a control section voltage control signal based on the adjusted voltage command signal, the control signal for use in supplying an output voltage at the power supply output point that is substantially equal to the desired output voltage. In that regard, the computer executable instruction for receiving a current signal representative of a control section current may comprise a computer executable instruction for sampling a current signal representative of a control section current, which sampling may be performed at variable periodic time intervals.

The computer executable instructions may also comprise instructions for predicting an expected output voltage of the power supply at the output point based on the adjusted voltage command signal, the current signal, the internal resistance and the external resistance, and generating a reported output voltage signal representative of the expected output voltage of the power supply at the output point. The computer executable instructions may further comprise instructions for performing a diagnostic function based on a comparison of the predicted output voltage and a measured control section voltage.

The computer executable instructions may still further comprise instructions for determining the control section internal resistance and the interconnect section external resistance based on a control section temperature measurement signal, a control section internal wire resistance, an interconnect section external wire resistance, and a calibration factor based on the control section wire length and the interconnect section wire length. The computer executable instructions may also comprise instructions for determining a temperature adjustment factor for adjusting the control section temperature measurement signal.

As is readily apparent from the foregoing, a system and method for controlling the output voltage of a power supply has been described that address various problems of prior art systems and methods. The embodiments of the system and method described herein eliminate the use of sense leads at the output point of the power supply interconnect cable, but without the use of thicker, lower resistance wire in the interconnect cable to do so. Such embodiments of a system and method for controlling the output voltage of a power supply instead compensate for voltage drop on the power supply interconnect cable, thereby decreasing costs while maintaining or improving the reliability of the operation of a vehicle power supply system.

While various embodiments of a system and method for controlling the output voltage of a power supply have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A system for controlling an output voltage of a power supply comprising a control section and an interconnect section having an output point, the system comprising:
    a voltage regulator for providing a control section voltage;
    a current measurement device for measuring a control section current and generating a current signal representative thereof; and
    a controller for (i) receiving the control section current signal and a voltage command signal representing a desired output voltage at the output point of the interconnect section, and (ii) generating an adjusted voltage command signal based on the voltage command signal representing the desired output voltage, the current signal, a control section internal resistance and an interconnect section external resistance;
    wherein the voltage regulator receives the adjusted voltage command signal and provides a control section voltage based thereon in order to supply an output voltage at the output point that is substantially equal to the desired output voltage.

2. The system of claim 1 wherein the controller is further for (iii) predicting an expected output voltage of the power supply at the output point based on the adjusted voltage command signal, the current signal, the internal resistance and the external resistance, and (iv) generating a reported output voltage signal representative of the expected output voltage of the power supply at the output point.

3. The system of claim 2 further comprising a voltage measurement device for measuring a control section voltage, and wherein the controller is further for performing a diagnostic function based on a comparison of the predicted output voltage and the measured control section voltage.

4. The system of claim 1 further comprising a temperature measurement device for measuring a control section temperature and generating a temperature signal representative thereof, and wherein the controller is further for determining the control section internal resistance and the interconnect section external resistance based on the control section temperature measurement signal, a control section internal wire resistance, an interconnect section external wire resistance, and a calibration factor based on the control section wire length and the interconnect section wire length.

5. The system of claim 4 wherein the controller is further for determining a temperature adjustment factor for adjusting the temperature measurement signal representing the measured control section temperature.

6. The system of claim 1 wherein the controller samples the control section current signal.

7. The system of claim 6 wherein the controller samples the control section current signal at periodic time intervals that may be varied.

8. A method for controlling an output voltage of a power supply comprising a control section and an interconnect section having an output point, the method comprising:
receiving a voltage command representing a desired output voltage at the output point of the interconnect section;
generating an adjusted voltage command based on the voltage command representing the desired output voltage, a control section current, a control section internal resistance and an interconnect section external resistance; and
providing a control section voltage based on the adjusted voltage command in order to supply an output voltage at the output point that is substantially equal to the desired output voltage.

9. The method of claim 8 further comprising:
predicting an expected output voltage of the power supply at the output point based on the adjusted voltage command, the control section current, the internal resistance and the external resistance; and
generating a reported output voltage signal representative of the expected output voltage of the power supply at the output point.

10. The method of claim 9 further comprising:
measuring a control section voltage; and
performing a diagnostic function based on a comparison of the predicted output voltage and the measured control section voltage.

11. The method of claim 8 further comprising:
measuring a control section temperature; and
determining the control section internal resistance and the interconnect section external resistance based on the measured control section temperature, a control section internal wire resistance, an interconnect section external wire resistance, and a calibration factor based on the control section wire length and the interconnect section wire length.

12. The method of claim 11 further comprising determining a temperature adjustment factor for adjusting the measured control section temperature.

13. The method of claim 8 wherein the control section current is sampled.

14. The method of claim 13 wherein the control section current is sampled at periodic time intervals that may be varied.

15. A non-transitory computer readable medium having computer executable instructions stored thereon for controlling an output voltage of a power supply comprising a control section and an interconnect section having an output point, the computer executable instructions comprising instructions for:
receiving a current signal representative of a control section current;
receiving a voltage command signal representing a desired output voltage at the output point of the interconnect section;
generating an adjusted voltage command signal based on the voltage command signal representing the desired output voltage, the current signal, a control section internal resistance and an interconnect section external resistance; and
providing a control section voltage control signal based on the adjusted voltage command signal, the control signal for use in supplying an output voltage at the output point that is substantially equal to the desired output voltage.

16. The computer readable medium of claim 15 further comprising computer executable instructions for:
predicting an expected output voltage of the power supply at the output point based on the adjusted voltage command signal, the current signal, the internal resistance and the external resistance; and
generating a reported output voltage signal representative of the expected output voltage of the power supply at the output point.

17. The computer readable medium of claim 16 further comprising computer executable instructions for performing a diagnostic function based on a comparison of the predicted output voltage and a measured control section voltage.

18. The computer readable medium of claim 15 further comprising computer executable instructions for determining the control section internal resistance and the interconnect section external resistance based on a control section temperature measurement signal, a control section internal wire resistance, an interconnect section external wire resistance, and a calibration factor based on the control section wire length and the interconnect section wire length.

19. The computer readable medium of claim 18 further comprising computer executable instructions for determining a temperature adjustment factor for adjusting the control section temperature measurement signal.

20. The computer readable medium of claim 15 wherein the instruction for receiving a current signal representative of a control section current comprises a computer executable instruction for sampling a current signal representative of a control section current.

* * * * *